(12) United States Patent
Hougham et al.

(10) Patent No.: US 8,624,152 B2
(45) Date of Patent: Jan. 7, 2014

(54) NEGATIVE COEFFICIENT THERMAL EXPANSION ENGINEERED PARTICLES FOR COMPOSITE FABRICATION

(75) Inventors: Gareth G. Hougham, Ossining, NY (US); Vijayeshwar D. Khanna, Millwood, NY (US); Xiao Hu Liu, Briarcliff Manor, NY (US); Gerard McVicker, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 13/356,778

(22) Filed: Jan. 24, 2012

(65) Prior Publication Data

US 2012/0121906 A1   May 17, 2012

Related U.S. Application Data

(62) Division of application No. 11/967,459, filed on Dec. 31, 2007, now Pat. No. 8,138,448.

(51) Int. Cl.
*B23K 26/00* (2006.01)
*B23B 3/00* (2006.01)
*H01L 21/30* (2006.01)

(52) U.S. Cl.
USPC .................. 219/121.64; 428/313.3; 438/455

(58) Field of Classification Search
USPC .......... 219/121.64–121.67; 428/313.3, 313.4, 428/313.9, 402; 438/455–457; 257/747, 257/750, 765
See application file for complete search history.

(56) References Cited

U.S. PATENT DOCUMENTS

| 4,332,999 | A | 6/1982 | Wittke |
| 6,924,171 | B2 | 8/2005 | Buchwalter et al. |
| 7,215,081 | B2 | 5/2007 | Bewlay et al. |
| 2004/0110322 | A1 | 6/2004 | Hougham et al. |

OTHER PUBLICATIONS

United States Official Action issued Jul. 15, 2011 in corresponding U.S. Appl. No. 11/967,459.

*Primary Examiner* — Sang Paik
(74) *Attorney, Agent, or Firm* — Scully, Scott, Murphy & Presser, P.C.; Daniel P. Morris, Esq.

(57) ABSTRACT

Methods for the fabrication of negative coefficient thermal expansion engineered elements, and particularly, wherein such elements provide for fillers possessing a low or even potentially zero coefficient thermal expansion and which are employable as fillers for polymers possessing high coefficients of thermal expansion. Further, disclosed are novel structures, which are obtained by the inventive methods.

11 Claims, 2 Drawing Sheets

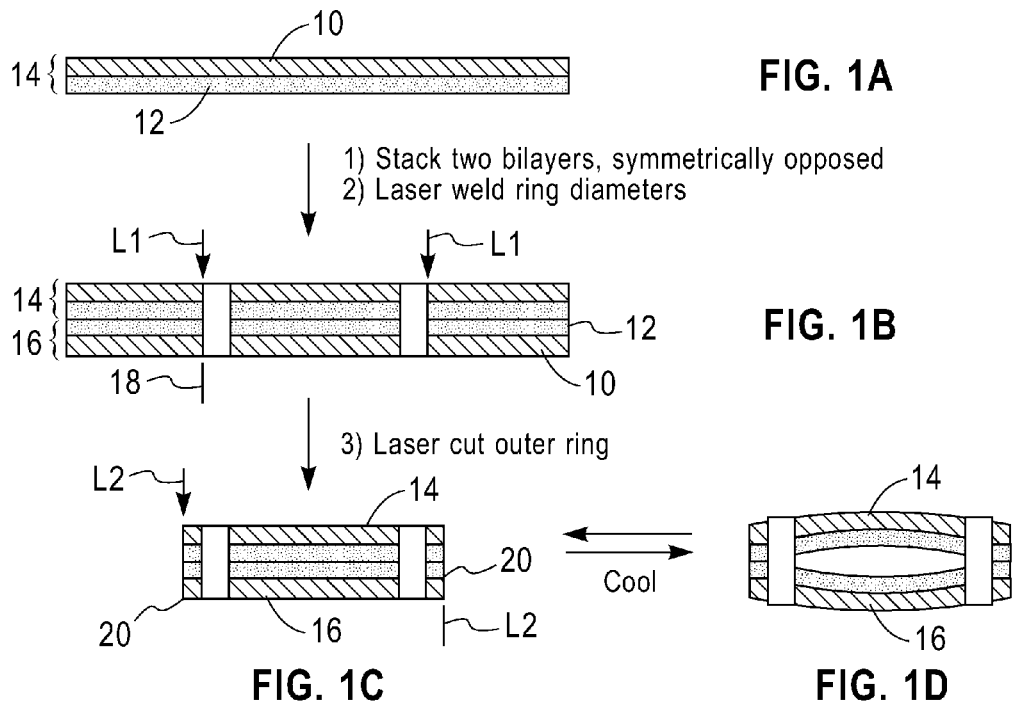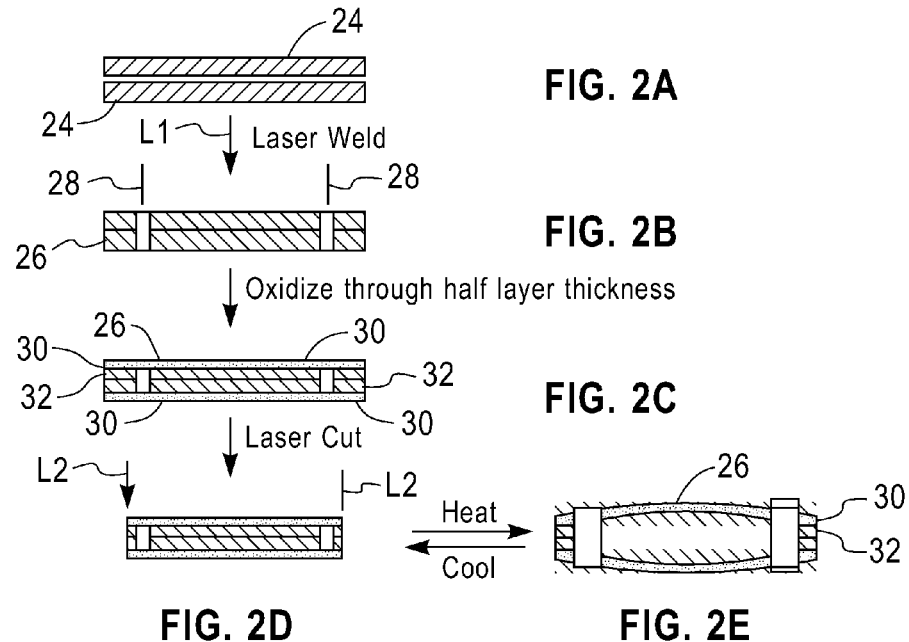

NEGATIVE COEFFICIENT THERMAL EXPANSION ENGINEERED PARTICLES FOR COMPOSITE FABRICATION

RELATED APPLICATION

This application is a divisional of U.S. Ser. No. 11/967,459, filed Dec. 31, 2007, the entire contents of which are incorporated herein by reference.

BACKGROUND OF THE INVENTION

Field of the Invention

The present invention relates to diverse methods for the fabrication of negative coefficient thermal expansion engineered elements, and particularly, wherein such elements provide for fillers possessing negative coefficient of thermal expansion and which are employable as fillers for polymers possessing high coefficients of thermal expansion to result in filled polymers with net low, zero, or negative coefficient of thermal expansion. The invention further relates to novel structures, which are obtained by the inventive methods.

In essence, polymers, which are adapted to be filled with negative coefficient of thermal expansion elements or particles that possess a low, zero or negative coefficient of thermal expansion (CTE), are in demand for intended applications in, for instance, the electronics and aeronautics industries.

In particular, the methods of fabricating these negative CTE elements or particles, and that serve as volume increasers for the polymer components may be produced by means of the novel methods so as to provide unique volumetrically expanded structures.

Accordingly, it is an object of the present invention to provide novel methods for the fabrication of negative coefficient of expansion engineered elements or particles, preferably utilized for fillers in polymer structures.

Another object of the invention resides in the provision of structures incorporating negative coefficient of expansion elements or particles that are fabricated pursuant to the inventive methods.

BRIEF DESCRIPTION OF THE DRAWINGS

Reference may now be made to the following detailed description of preferred embodiments of the invention, taken in conjunction with the accompanying drawings, in which:

FIGS. 1A through 1D illustrate a progressive sequence of the steps in a method of fabricating the zero or negative coefficient of thermal expansion engineered particles or elements;

FIGS. 2A through 2E illustrate modified method steps employed in forming another structure pursuant to the present invention.

DETAILED DESCRIPTION OF THE INVENTION

Figure 3:
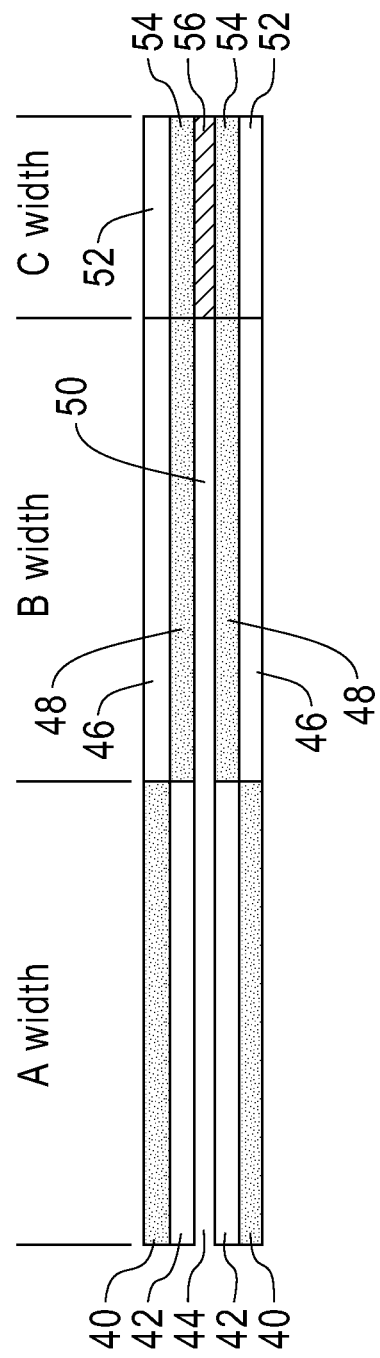
FIG. 3 illustrates another variant of a negative CTE device/particle structure.

Pursuant to the fabrication of a first embodiment of the present invention, there is employed the following method, as represented in FIGS. 1A through 1D of the drawings.

Referring in particular to FIG. 1A of the drawings, there are provided in superposition two separate material layers 10, 12 in sheet form, which possess different coefficients of thermal expansion (CTEs), i.e. such as Al, Cu or the like. These two layers, which form a bilayer sheet 14 may be stacked with a reversely or oppositely oriented and symmetrically arrayed bilayer 16 consisting of identical materials 10, 12 in flat superposition, as shown in FIG. 1B. A first projection laser L1 is adapted to weld the superimposed bilayers 14, 16 together in a repeating annular pattern along line 18, so as to produce essentially disk-shaped structured configurations, as in FIG. 1C. The annular welding by projection laser L1 need not be continuous, but may be in the nature of spot welds; for example, three spots spaced at 120-degree intervals about the perimeter of each disk-shaped structure. This will enable the remaining areas to maintain freedom of movement. These disk-shaped configurations, or essentially ring structures formed on the bilayers 14, 16 are not touching neighboring ring structures across the repeating pattern on the sheet and leave a small linear distance on the sheet between each annulus 18, possibly such as a half-radius. A further process step, as in FIG. 1C, resides in employing a second laser L2, to cut these annular structures 18 out from the sheets 14, 16 by focusing the laser in an annular pattern along a circular cutting line 20, which is larger then the annular weld pattern at 18, and whereby the cutting laser conditions differ from those of the welding laser conditions. The cutting laser intensities may hereby be higher or the pulse frequencies and/or widths may differ. Moreover, a different type of laser may also be advantageous or possibly by employing a different laser wavelength.

These foregoing method steps, as described in connection with FIGS. 1A through 1C, are preferably performed at elevated temperatures, so that when the final disk-shaped particles 18 are cooled, the differential coefficient thermal expansions within each of the bilayers force the disk-shape structure to open up, as in FIG. 1D of the drawings, and thus increase the volume of the overall structure.

As illustrated in the embodiment of the method as described in FIGS. 2A through 2E of the drawings, a single type of material is initially employed for each of two sheet-like layers 24, as shown in FIG. 2A, for example, such as aluminum or the like. The two layers 10 are laser welded together, as shown in FIG. 2B, by a suitable projection laser L1 into an annular or disk-shaped structure 26 along an annular weld line 28. Each of the layers 10 are then converted by processing into a bilayer 30, 32 with different coefficients of thermal expansion, as represented in FIG. 2C. Thus, the structure 26 is oxidized in a controlled-atmosphere furnace so that there is grown a precise thickness of aluminum oxide 30 on each outer surface. The aluminum oxide ($Al_2O_3$) has a lower CTE than the Al thickness portion. The resultant annular sheet is then laser cut by a laser L2, as shown in FIG. 2D, so as to release or separate disk-shaped or annular particles or elements from the remaining sheet. The method steps are all implemented at elevated temperatures so that a zero stress condition is obtained at higher temperature, where the bilayers 30, 32 are flat. Upon cooling, these disk-shaped particles or elements are then opened or spread apart internally, increasing their volume, as shown in FIG. 2E of the drawings.

In accordance with modified methods employed in forming structures of the type under consideration, the following approaches are possible:

Another example starting with a single layer, similar to that of FIGS. 2A through 2E, would be the coating of a sacrificial core polymer disk with aluminum, followed by controlled oxidation to Al2O3 through a fraction of the Al thickness. After the polymer is decomposed a hollow disk shaped structure remains which is in a low stress state at the temperature at which the oxidation was performed. Upon cooling, these particles would open up increasing their volume.

Pursuant to a further modification, the following concept may be used:

Another embodiment is to cause a sheet of material to be adhered to a second sheet of the same material, where the adhesive would be applied in an annular pattern, and wherein the adhesive processes a higher CTE than the sheet material. Laser cutting could then be used to excise the disk shaped device around the outside of the adhesive ring. The processing, including the adhesion step, should be carried out at elevated temperatures so that upon final cooling the shrinkage of the high CTE adhesive would be greater than that of the sheet material and cause a curvature to develop in the sheet and possibly even occurring in buckling. A variant of this approach would be to use a bilayer sheet material with a low CTE layer on the outside to force the development of positive curvature upon cooling (convex from the outside) and to negate the possibility of particle collapse where one sheet would have positive curvature and the other negative (where the two layers would nest as with two spoons).

Another embodiment, as disclosed in FIG. 3, can be obtained utilizing the inventive method. Hereby, it is possible to have the directions of the bilayer reversed near the edge so that it would curve in the opposite direction and thus help reduce edge stress during opening.

FIG. 3 shows a crossection of the right hand side of the device. The full structure would additionally show the minor image attached seamlessly to the left side of the figure. Three sections are shown. An "A width" a "B width" and a "C width". The A section is typical of the negative CTE devices previously described to the extent that the outer layers 40 consist of low CTE material, the inner layers 42 consists of a higher CTE material, and there is a gap 44 consisting of no material. The B section reverses this general sequence and has a high CTE layer 46 on the outsides, and a lower CTE material 48 on the inside. With a gap 50 separating them. The C section has the same sequence as the B section (high CTE on the outside 52 and low CTE on the inside 54) except that a layer 56 that welds the inner low CTE layers together now replaces the gap.

The relative lengths of the A, B, and C sections, as well as the relative thicknesses of the high and low CTE layers and the weld layer, are variable depending on the material properties of the constituent materials used. Such as the elastic modulus, the CTE, etc., as well as the optimized performance for a use as a filler in a particular polymer.

The effect of reversing the layer sequence near the device edges is that upon imposing a delta T, this creates an edge curvature which deviates from the plane faster than the reverse sequence and results in a larger overall volumetric change. It is to be understood that many varieties of such a structure could be easily conceived, each with different advantages and tradeoffs. One such would merge layers 46 with 42 by co-depositing them in a single process step followed by a following step to deposit layer 40.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. A negative coefficient of expansion-engineered element or particle, comprising:
    two layers of a sheet material in surface contact with each other, each said layer comprising two superimposed sheets having differing coefficients of thermal expansion forming a bilayer;
    said bilayers being laser welded about an enclosing path so as to produce a closed structure;
    said bilayer sheets further being laser cut in a path extending externally of said laser welded path to separate said closed structure from the remaining bilayer sheets; and
    said closed structure being responsive to a cooling action whereby said different coefficients of thermal expansion of said bilayers causes said closed structure to assume a volume, wherein each said bilayer is initially formed from superimposed sheets constituted of identical metallic material, each said sheet having the contiguous surfaces thereof oxidized to a half-thickness of the respective sheet subsequent to being laser welded so as to form said closed bilayer structure.

2. An element or particle as claimed in claim 1, wherein each said bilayer is initially formed from superimposed sheets each constituted of a different material from the other sheet.

3. An element or particle as claimed in claim 1, wherein said metallic material comprising aluminum, and said oxidizing forms a layer of aluminum oxide.

4. An element or particle as claimed in claim 1, wherein said closed structure is essentially of a disk-shaped cushion configuration.

5. An element or particle as claimed in claim 1, wherein a plurality of said closed structures are formed from said layers of sheet material.

6. An element or particle as claimed in claim 1, wherein said closed structure consisting of said elements or particles is utilized for filling of polymers so as to increase the volumes of polymer products.

7. An element or particle as claimed in claim 1, possessing a net negative CTE which has enhanced volumetric expansion capability by virtue of reducing the fraction of the edge perimeter that is welded or otherwise attached to a bottom layer.

8. An element or particle as claimed in claim 1, wherein said laser welding is implemented at three spots about the perimeter of said structure at 120-degreees from each other to facilitate freedom of movement of the remaining areas thereof.

9. A structure comprising:
    top and bottom disk shaped components, each component comprising two superimposed sheets having differing coefficients of thermal expansion forming a bilayer, wherein an outer sheet of each top and bottom component is of a lower CTE and an inner sheet of each top and bottom component possesses a higher CTE, said top and bottom disk shaped components defining an edge; and
    the sequence of the high and low CTE layers near the edge are reversed.

10. An element as claimed in claim 9, wherein said top and bottom disk shaped components comprising respective bilayers enhance a negative CTE overall behavior by imposing a curvature bias.

11. An element or particle as claimed in claim 9, wherein said top and bottom disk shaped components comprises two identical sheets of said lower CTE being adhered together by an adhesive material possessing said higher CTE.

* * * * *